(12) United States Patent
Hillyer

(10) Patent No.: US 9,737,108 B2
(45) Date of Patent: Aug. 22, 2017

(54) FOOTWEAR INCLUDING A REMOVABLE AND REPLACEABLE UPPER

(71) Applicant: DECKERS OUTDOOR CORPORATION, Goleta, CA (US)

(72) Inventor: Christopher Hillyer, Goleta, CA (US)

(73) Assignee: DECKERS OUTDOOR CORPORATION, Goleta, CA (US)

( * ) Notice: Subject to any disclaimer, the term of this patent is extended or adjusted under 35 U.S.C. 154(b) by 141 days.

(21) Appl. No.: 14/461,389

(22) Filed: Aug. 16, 2014

(65) Prior Publication Data

US 2014/0352171 A1    Dec. 4, 2014

Related U.S. Application Data

(63) Continuation-in-part of application No. 13/755,551, filed on Jan. 31, 2013, now Pat. No. 9,078,487.

(51) Int. Cl.
  *A43B 3/10* (2006.01)
  *A43B 3/00* (2006.01)
  *B29D 35/12* (2010.01)

(52) U.S. Cl.
  CPC .......... *A43B 3/0078* (2013.01); *A43B 3/103* (2013.01); *A43B 3/105* (2013.01); *B29D 35/126* (2013.01); *B29D 35/128* (2013.01)

(58) Field of Classification Search
  CPC ................................ A43B 3/122; A43B 3/103
  USPC ......................................................... 36/11.5
  See application file for complete search history.

(56) References Cited

U.S. PATENT DOCUMENTS

| | | | |
|---|---|---|---|
| 3,553,754 A | 1/1971 | Mendelsohn | |
| 4,172,330 A | 10/1979 | Kao | |
| 4,535,554 A | 8/1985 | De Obaldia B. | |
| 4,578,843 A | 4/1986 | Lewis | |
| 4,839,948 A | 6/1989 | Boros | |
| 5,467,507 A | 11/1995 | Marsh et al. | |
| 5,670,274 A | 9/1997 | Forrer | |
| 5,802,738 A | 9/1998 | Ferniani | |
| 5,896,684 A | 4/1999 | Lin | |
| 6,883,252 B2 | 4/2005 | Cagner | |
| 7,540,098 B2 | 6/2009 | Bast et al. | |
| 7,650,704 B2 | 1/2010 | Richardson | |
| 7,694,436 B2 | 4/2010 | Mullen | |
| 8,171,654 B2 | 5/2012 | Rudd, Jr. et al. | |
| 9,072,338 B1 * | 7/2015 | Kostecky | A43B 7/26 |
| 2006/0080813 A1 * | 4/2006 | Pearce | A43B 3/122 |
| | | | 24/662 |
| 2008/0155788 A1 * | 7/2008 | Wilcox | A43B 3/0078 |
| | | | 24/3.1 |

(Continued)

FOREIGN PATENT DOCUMENTS

| | | | | |
|---|---|---|---|---|
| IT | CA 2317177 A1 * | 3/2001 | ............... | A43B 3/10 |
| NL | WO 2012161576 A1 * | 11/2012 | ............. | A43B 3/103 |

*Primary Examiner* — Ted Kavanaugh
(74) *Attorney, Agent, or Firm* — Greer, Burns & Crain, Ltd.

(57) ABSTRACT

An article of footwear including an outsole, a fabric upper and at least one connector including a first male member co-molded with the fabric upper and a second female member. The first member includes at least one rib and the second member includes at least one groove, where the at least one connector is secured to the outsole by inserting the second member in the outsole and engaging the at least one rib of the first member with the at least one groove of the second member.

9 Claims, 6 Drawing Sheets

(56) References Cited

U.S. PATENT DOCUMENTS

| | | |
|---|---|---|
| 2009/0044423 A1 | 2/2009 | Amsterdam |
| 2009/0260260 A1 | 10/2009 | Whitaker et al. |
| 2009/0320325 A1 | 12/2009 | Escario |
| 2010/0095493 A1 | 4/2010 | Chawla et al. |
| 2010/0132223 A1 | 6/2010 | Lewis |
| 2011/0314694 A1 | 12/2011 | Marmar et al. |
| 2014/0123448 A1* | 5/2014 | Tussy .................. A43B 3/103 24/68 SK |

* cited by examiner

FOOTWEAR INCLUDING A REMOVABLE AND REPLACEABLE UPPER

PRIORITY CLAIM

This application is a continuation-in-part application of and claims the benefit of U.S. patent application Ser. No. 13/755,551 filed on Jan. 13, 2013, which is incorporated herein in its entirety.

BACKGROUND

Sandals, flip flops and similar open-toe shoes typically include an upper attached to an outsole. For example, conventional flip flops include an upper having a toe post and side supports extending from the toe post. The upper may be made out of rubber, ethylene vinyl acetate (EVA) or fabric. Fabric uppers are usually made using one or two lengths of fabric stitched at one end to form the toe post and the free ends extending from the toe post form the side supports on opposing sides of the upper.

To secure the upper to the outsole, the outsole includes an upper part and a lower part such that a portion of the toe post is inserted through an opening in the upper part of the outsole and extends underneath the upper part such that when the lower part is attached to the upper part, the portion of the toe post is secured between the upper and lower parts. Similarly, the ends of the side supports extend around the sides of the upper and underneath the upper part of the outsole such that the side support ends are also secured between the upper and lower parts of the outsole when the parts are attached together. Manufacturing sandals and flip flops in this manner requires extra material for securing the toe post and side supports between the upper and lower parts of the outsole, which increases manufacturing and material costs.

Accordingly, there is a need for a fabric upper that is easily attached to and removable from an outsole while reducing the manufacturing and material costs associated with making these shoes.

BRIEF SUMMARY

The present article of footwear includes a fabric upper removably connected to an outsole by inserting connectors co-molded to the upper through through-holes defined by the outsole thereby reducing manufacturing time and material costs.

An embodiment of the present article of footwear includes a fabric upper and at least one connector having an upper member with two spaced sidewalls. At least a portion of the upper being inserted between and co-molded with the sidewalls of the connector.

Another embodiment of the present article of footwear includes an outsole having a through-hole and a fabric upper including at least one connector. The connector includes an upper member having two spaced sidewalls, where at least a portion of the upper is inserted between and co-molded with the sidewalls. The upper is connected to the outsole by inserting the at least one connector through the through-hole of the outsole.

Another embodiment of the present article of footwear includes an outsole including a plurality of through-holes and a fabric upper including a toe post, two lateral supports extending from the toe post and a plurality of connectors. Each of the connectors includes an upper member having two spaced sidewalls where the toe post and at least a portion of each of the lateral supports is inserted between and co-molded with the sidewalls of one of the connectors. The upper is connected to the outsole by inserting each of the connectors through a corresponding one of the plurality of through-holes of the outsole.

In another embodiment, an article of footwear including an outsole, a fabric upper and at least one connector including a first male member co-molded with the fabric upper and a second female member. The first member includes at least one rib and the second member includes at least one groove, where the at least one connector is secured to the outsole by inserting the second member in the outsole and engaging the at least one rib of the first member with the at least one groove of the second member.

In a further embodiment, an article of footwear includes an outsole defining at least one through-hole, a fabric upper having a plurality of ends and at least one connector including a male member co-molded with at least one of the ends of the fabric upper and a female member. The female member is configured to be inserted into the at least one through-hole, where the upper is secured to the outsole by matingly engaging the male member with the female member in the at least one through-hole.

In another embodiment, an article of footwear includes an outsole defining at least one through-hole and a recessed area in communication with the at least one through-hole, a fabric upper and at least one connector including a male member and a washer assembly. The male member is co-molded with the fabric upper and the washer assembly defines a receptacle, where the upper is secured to the outsole by inserting the washer assembly into the recessed area and inserting the male member through the through-hole into mating engagement with the receptacle of the washer assembly.

DETAILED DESCRIPTION

Figure 1:
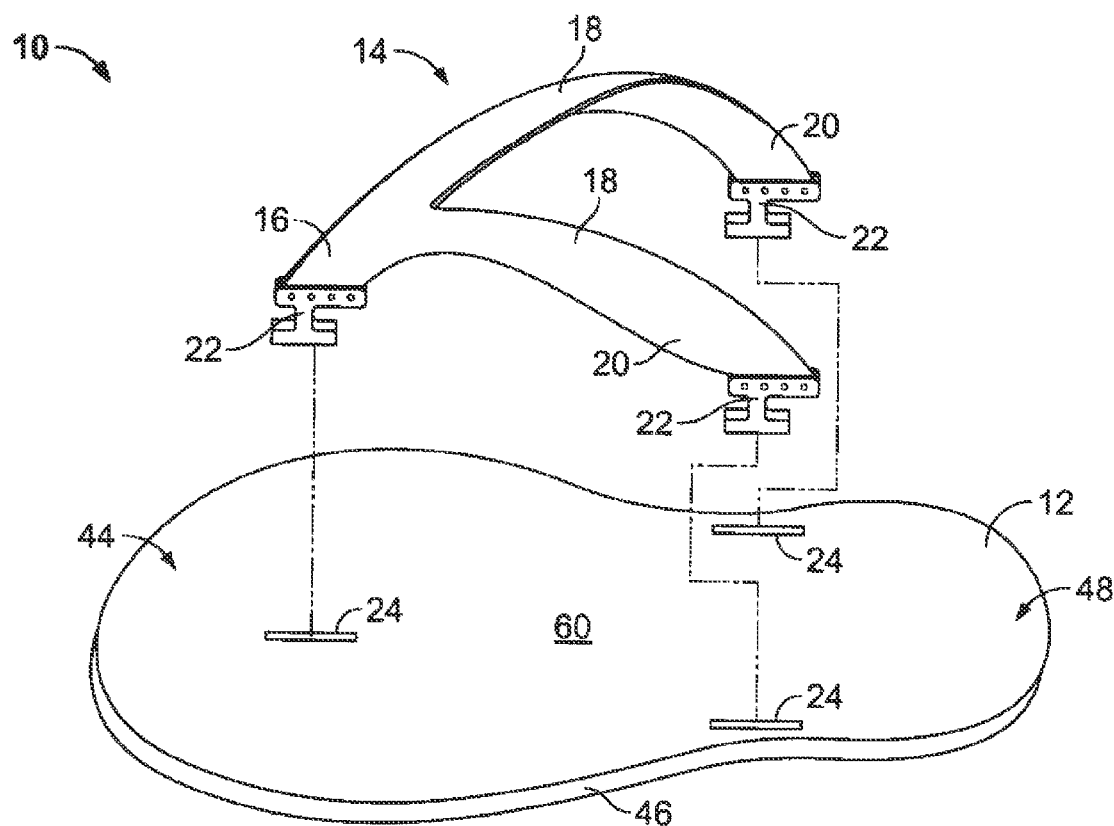
FIG. 1 is an exploded perspective view of the article of footwear of the present invention.
Figure 2:
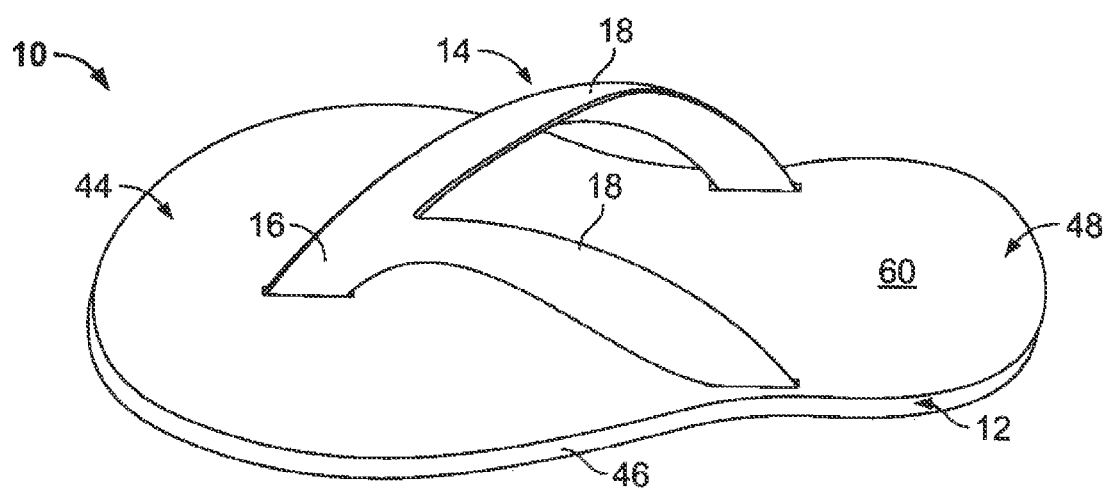
FIG. 2 is a perspective view of the article of footwear of FIG. 1 showing the upper connected to the outsole.

Referring now to FIGS. 1-7, a present article of footwear is illustrated that includes an upper having connectors that enable the upper to be removably attached to an outsole for easy assembly and reduction of cost and materials associated with making the article of footwear.

The present article of footwear 10 includes an outsole 12 and a fabric upper 14 attached to the outsole where the upper has a toe post 16 and two lateral supports 18 extending from the toe post. The toe post 16 and each end 20 of the lateral supports 18 includes a plug-type connector 22 that are each inserted through openings or through-holes 24 formed in the outsole 12 to secure each 20 end of the lateral supports 18 and the toe post 16 to the outsole.

Figure 4:
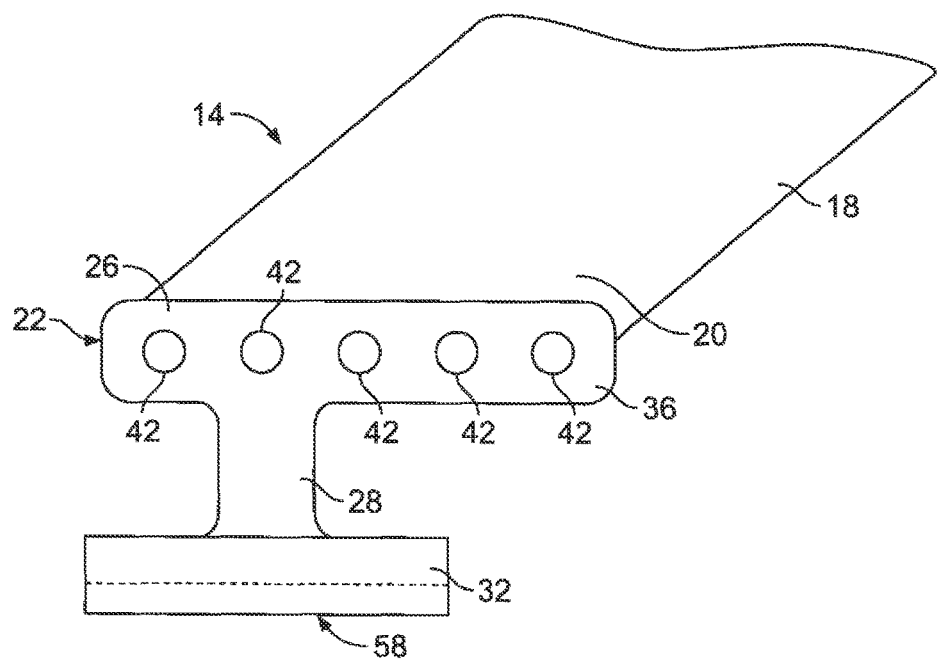
FIG. 4 is an enlarged side view of a connector attached to a portion of the upper.
Figure 5:
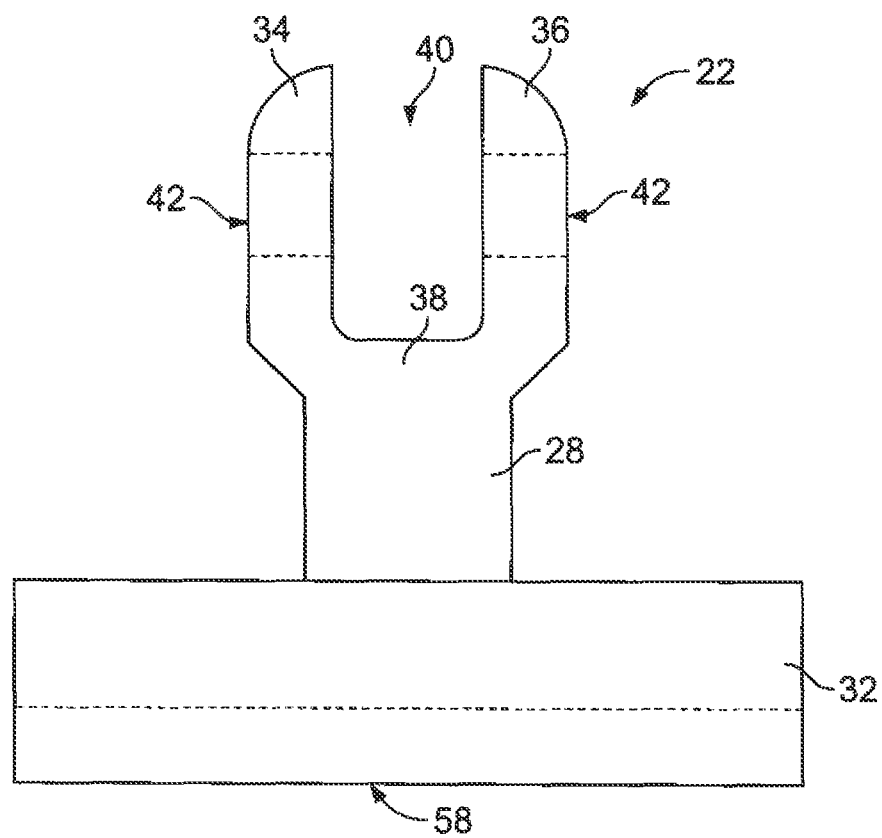
FIG. 5 is an enlarged front view of the connector of FIG. 4 with the portion of the upper removed from the connector.
Figure 6:
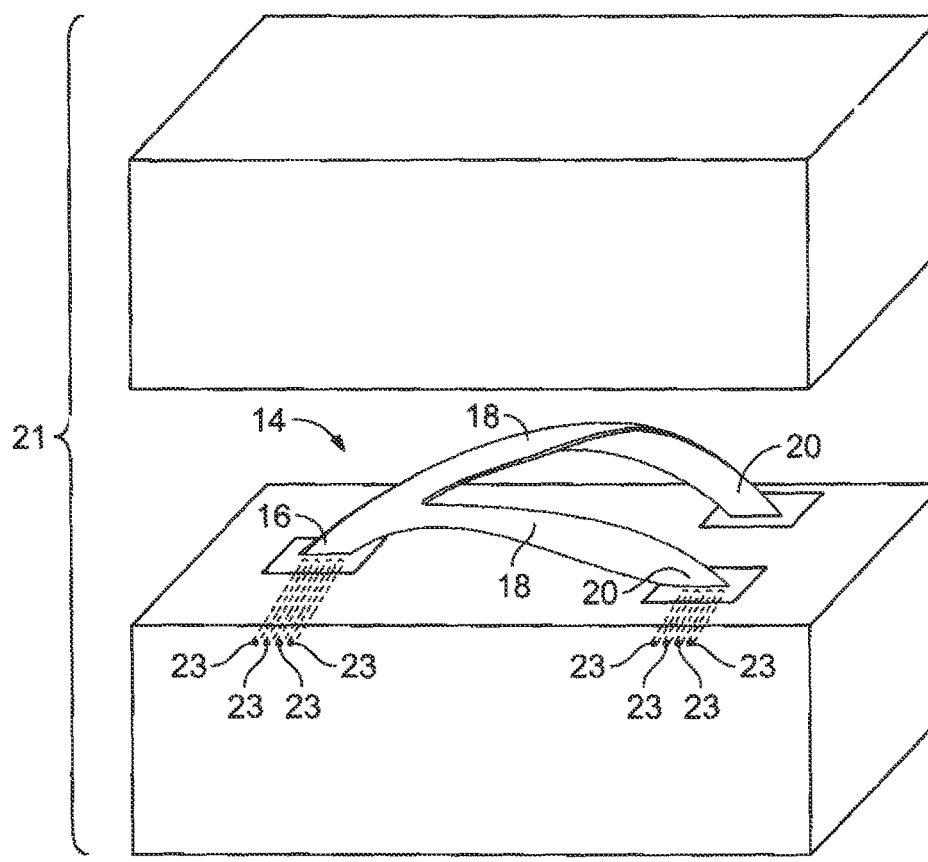
FIG. 6 is perspective view of a mold used to form the upper of the article of footwear of FIG. 1.

Referring now to FIGS. 4 and 5, each of the connectors 22 includes a U-shaped upper member 26, a support post 28 connected to the U-shaped upper member at one end 30*a* and to a lower securing member 32 at an opposing end 30*b*. The upper member 26 includes a first sidewall 34 and a second sidewall 36 that are spaced from each other and joined together by a bottom wall 38 where the first sidewall, the second sidewall and the bottom wall define an open channel 40 as shown in FIG. 5. The support post 28 is preferably integrally formed with and extends from the bottom wall 38 and is also integrally formed with the lower member 32 which has a cylindrical shape. It should be appreciated that the lower member 32 may have a square shape or any suitable shape.

Referring now to FIGS. 1, 2, 4 and 6, the toe post 16 and each end 20 of the lateral supports 18 are co-molded with one or more of the connectors 22. Specifically, the toe post 16 and/or the free ends 20 of the lateral supports 18, which are fabric ends, are inserted into a mold 21. A plurality of pins 23 movably connected to the mold and are used to hold the free material ends 20 and the material end forming the toe post 16 in position in the mold 21 during the molding process. Once the material or fabric ends are secured in the mold 21, a separate material, such as Ethylene Vinyl Acetate (EVA) or rubber, which forms the connector, is injected into the mold via a suitable inlet. The injected material forms the first and second sidewalls 34, 36 of the upper member 26 and surrounds the opposing sides of the fabric end or ends, and at least partially seeps into the fabric such that when the injected material cures it is securely intertwined with and connected to the fabric ends. The support post 28 and the lower member 32 are also formed during the injection molding process such that when the molding operation is complete, one of the integrally formed connectors is securely co-molded with at least one of the toe post 16 and each end 20 of the lateral supports 18 of the upper 14. After the material is injected into the mold 21, the pins 23 are removed from the fabric thereby forming a series of openings 42 in the first and second sidewalls 34, 36 of each connector 22. It should be appreciated that any suitable number of pins 23 may be used to hold the fabric ends of the upper 14 in position in the mold 21 during the molding process.

Figure 3:
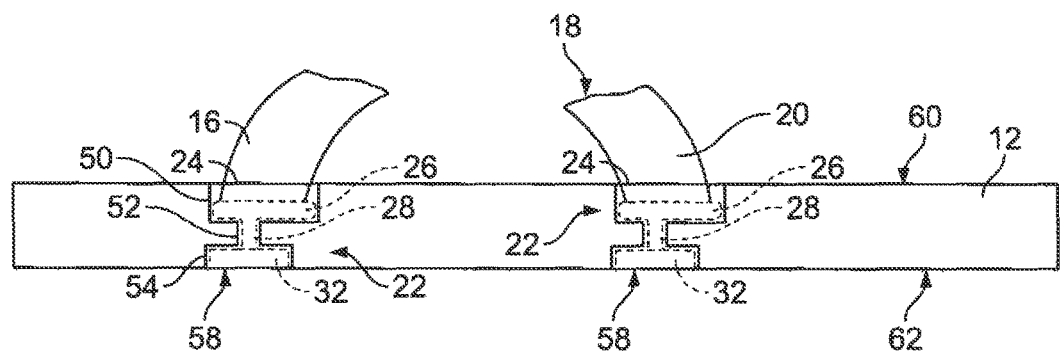
FIG. 3 is a fragmentary side view of the article of footwear of FIG. 2.

After the ends of the toe post 16 and ends 20 are co-molded with one or more of the connectors 22, the connectors 22 are attached to the outsole 12. Specifically, the outsole 12 defines one or more openings or through-holes 24 where one of the through-holes 24 is located at a forefront portion 44 of the outsole and two additional through-holes 24 are located on each side 46 of the outsole near the heel portion 48 of the outsole. As shown in FIG. 3, each of the through-holes 24 includes an upper portion 50, a central portion 52 and a bottom portion 54 that correspond to the size and shape of the connectors 22. Specifically, the upper portion 50 has a size and shape that corresponds to the size and shape of the upper member 26, the central portion 52 has a size and shape that corresponds to the size and shape of the support post 28 and the lower portion 54 has a size and shape that corresponds to the size and shape of the lower member 32. To facilitate insertion of the connectors 22 through the through-holes 24, the outsole 12 is made of a foam material or other suitable material that is flexible such that when each connector 22 is inserted into each through-hole 24, the material flexes or expands to allow the lower member 32 of each connector 22 to be pushed through the through-holes 24 and then seated in the bottom recessed portion 54 of the through-holes.

In the illustrated embodiment, the upper and lower portions 50, 54 of the through-holes 24 are recessed such that after the connectors 22 are inserted into and through each of the through-holes, a top surface 56 of the upper member 26 and a bottom surface 58 of the lower member 32 are respectively flush with upper and lower surfaces 60 and 62 of the outsole 12. The lower member 32 of each of the connectors 22 is configured to have a width or diameter that is greater than a width or diameter of the support post 28 such that when the connectors are inserted and connected to the outsole 12, the lower member cannot be readily moved through or removed from the through-holes 24 during use.

Figure 7:
FIG. 7 is a bottom view of the connector of FIG. 4.

Referring now to FIG. 7, in an embodiment, the bottom surface 58 of the lower member 32 of each connector 22 includes a symbol, logo, insignia or other suitable symbol or logo 64 molded onto the connector. The symbol 64 on the bottom surface 58 of the connector 22 can be used to identify the style, brand or other information about the connector or the article of footwear. It should be appreciated that any suitable symbol, insignia, logo or identifier may be molded or attached to the bottom surface 58 of the connectors 22.

Figure 8:
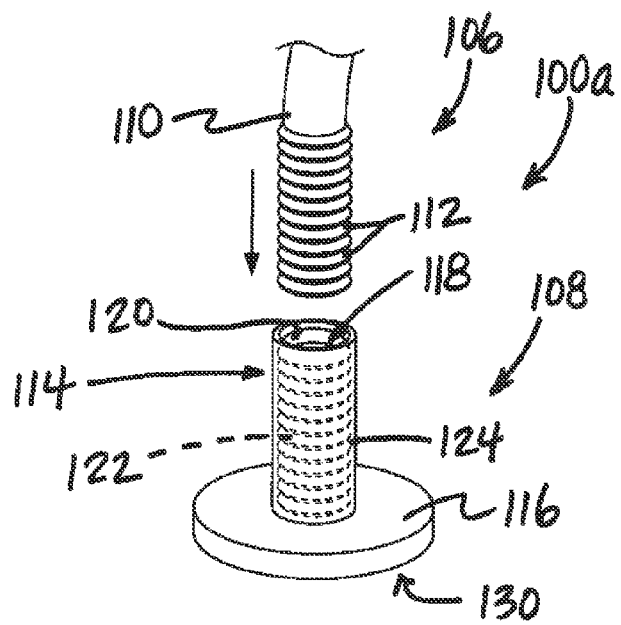
FIG. 8 is an enlarged, fragmentary exploded perspective view of another embodiment of an end of an upper and a plug connector of the present invention.
Figure 9:
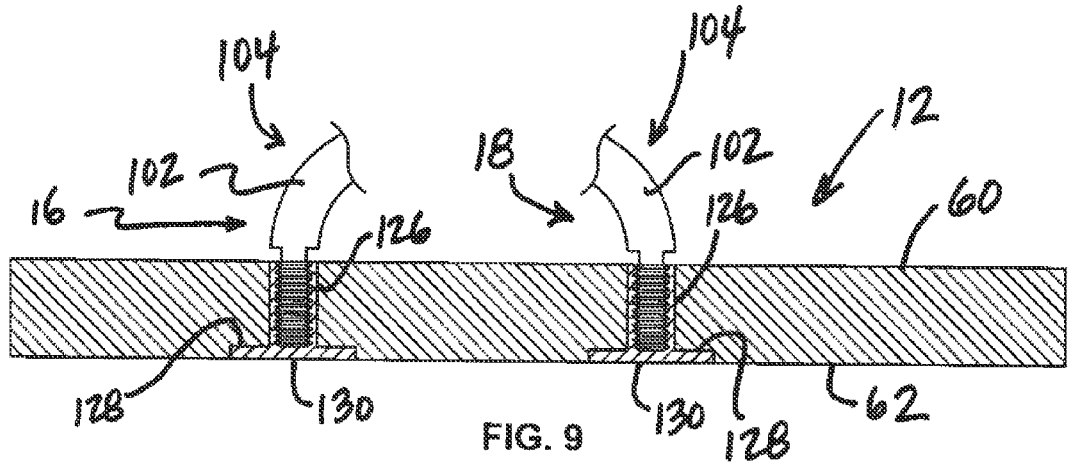
FIG. 9 is a fragmentary side view of an article of footwear having an upper with the end and the plug connector of FIG. 8.

Referring now to FIGS. 8 and 9, another embodiment of connector designated by reference number 100*a*, is illustrated where the connector 100*a* may be attached to one or more ends 102 of the upper 104 as described above. In this embodiment, the connector 100*a* includes a first member 106 and second member 108 that matingly engage each other. The first member 106 is a tubular or cylindrical male member having an outer surface 110 with at least one rib 112, and preferably a plurality of ribs 112, as shown in FIG. 8. The first member 106 is co-molded with an end 102 of the upper 104 as described above by injection molding EVA or a similar material over the end of the upper so that the first member 106 and the end 102 of the upper 104 are bonded or securely connected to each other. A second member 108 is a female plug-type member having a tubular or cylindrical post 114 and a flange 116 radially extending from an end of the post. The post 114 defines a hollow inner chamber 118 having an inner surface 120 formed with at least one groove 122, and preferably a plurality of grooves, where the ribs 112 on the first member 106 matingly engage the grooves 122 on the inner surface of the second member 108.

As shown in FIGS. 8 and 9, the inner chamber 118 of the second member 108 is configured to have a size and shape, and more specifically, a diameter that is slightly larger than a diameter of the first member 106 such that when at least a portion of the first member is inserted into the inner chamber 118 of the second member 108, the ribs 112 on the first member 106 matingly engage and are locked by the corresponding grooves 122 of the inner chamber 118 of the second member 108. In the illustrated embodiment, the first member 106 is not removable from the second member 108 when any of the ribs 112 on the first member matingly engage the grooves 122 in the inner chamber of the second member. In another embodiment, the first member 106 is releasable from the second member 108 by pressing on an outer surface 124 of the post 114 while pulling the first member 106 out of the inner chamber 118 of the second member 108. As shown in FIG. 9, the post 114 of the second member 108 is configured to have a height that corresponds to the height or length of the ribs 112 on the first member 106 so that the ribs on the first member are completely concealed by or hidden by the post 114 on the second member 108 when the first member is fully inserted into the inner chamber of the second member. Furthermore, the diameter of the flange 116 is configured to be greater than the diameter of the post 114 for securely holding the connector 100a in the outsole 12 of the shoe as described below.

As stated above, the connector 100a may be attached to the toe post 16, and one or both of the lateral supports 18 for securing the toe post and/or the lateral supports to the outsole 12 of the article of footwear or shoe. As shown in FIG. 9, the outsole 12 includes or defines an elongated tubular or cylindrical through-hole 126 that corresponds in size and shape to size and shape of the post 114 on the second member 108 of the connector 100a and a recessed area 128 in communication with the through-hole which corresponds to the size and shape of the flange 116. The second member 108 is inserted into the outsole 12 by inserting the post 114 from the bottom of the outsole and into the through-hole 126 until the flange 116 is seated in the recessed area 128 such that a bottom surface 130 of the second member 108 is flush with a bottom surface 62 of the outsole 12. The top of the post 114 of the second member 108 is preferably flush with the top surface 60 of the outsole 12 of the article of footwear. It should be appreciated that the top of the post 114 may be recessed from or spaced a designated distance below the top surface 60 of the outsole 12 to conceal the connection of the end 102 of the upper 104 to the connector 100a.

After the second member or female member 108 of the connector 100a is secured in the through-hole 126 and the recessed area 128 of the outsole 12 shown in FIG. 9, the first member or male member 108 attached to a respective end 102 of the upper 104 is inserted into the inner chamber 118 of the post 114 of the female member 108 so that the ribs 112 matingly engage the respective grooves 122 on the inner chamber to secure the first member 106 to the second member 108. After each end 102 having the connectors 100a are secured to the outsole 12, the flanges 116 on the second members 108 securely hold the connectors 100a in the outsole 12 because the flanges have a diameter that is greater than the diameter of the respective through-holes 126 in the outsole. It is contemplated that the first and second members 106, 108 of each connector 100a shown in FIGS. 8 and 9 may have a cylindrical shape, a square shape or any suitable shape that enables the first and second members of the connector to be secured to each other.

Figure 10:
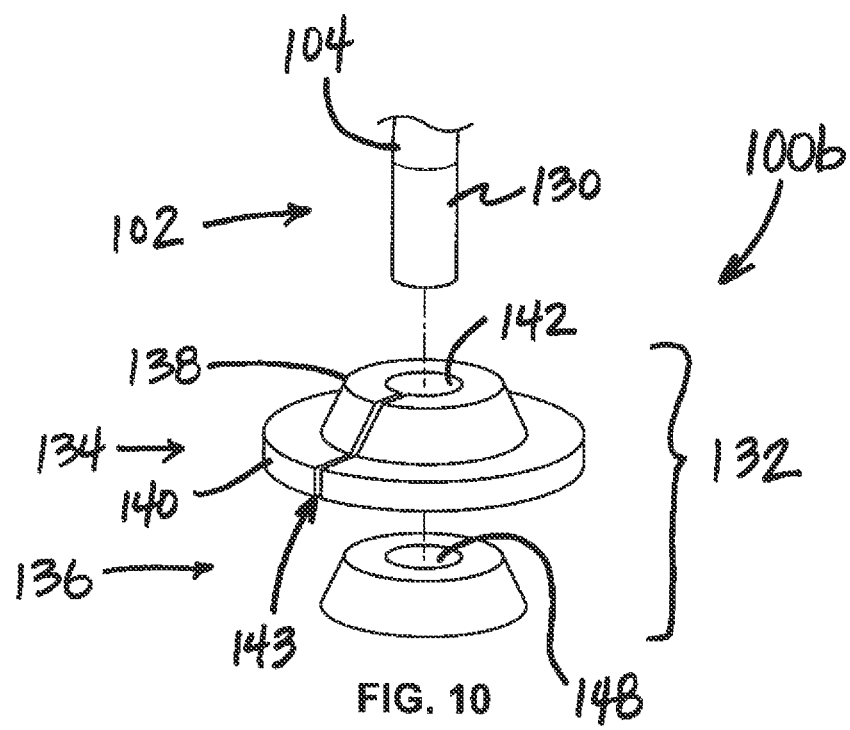
FIG. 10 is an enlarged, fragmentary exploded perspective view of a further embodiment of an end of an upper, a washer and a plug connector of the present invention.
Figure 11:
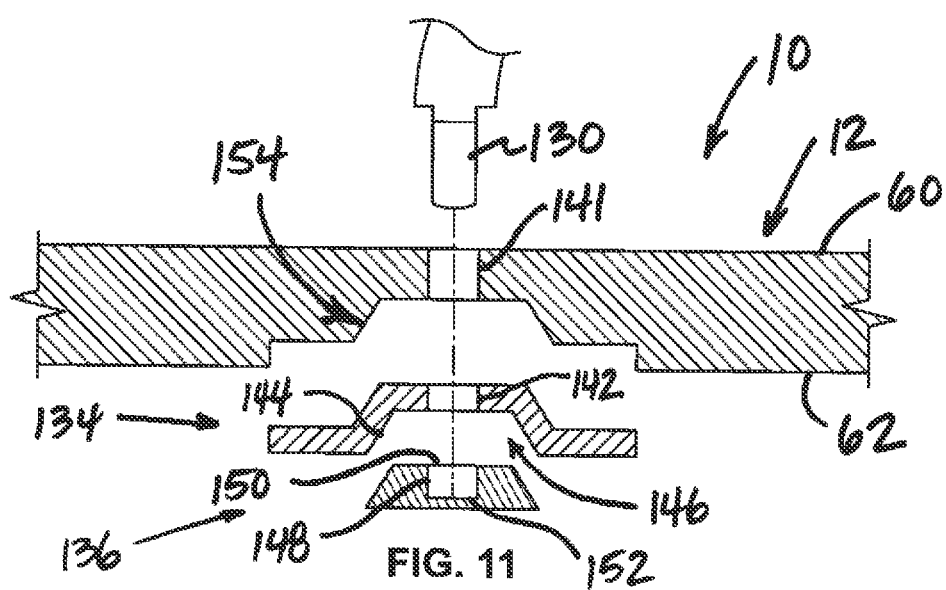
FIG. 11 is a fragmentary side view of an article of footwear having an upper with the end, the washer and the plug connector of FIG. 10.

FIGS. 10 and 11 show a further embodiment of the connector, designated by reference number 100b, which is used to hold one or more ends 102 of an upper 104 in an outsole 12 is illustrated where the connector 100b includes a tubular or cylindrical male member 130 that is co-molded with a respective end 102 of the upper 104 by injection molding or another suitable connection method as described above. The male member 130 is secured to the outsole 12 by a washer assembly 132. As shown in FIG. 10, the washer assembly 132 includes a first washer 134 and a second washer 136. The first washer 134 includes an upper tapered body 138 and a lower flange 140 that radially extends from the upper body. The upper body 138 and lower flange 140 each define a through-hole 142, 144 that combine to extend along an entire height of the first washer 134 and have a diameter that is slightly greater than a diameter of the male member. Additionally, the first washer 134 defines an inner, central recessed area 146 as shown in FIG. 11 that is configured to have a size and shape for receiving the second washer 136.

The second washer 136 is configured to have a size and shape that corresponds to the size and shape of the recessed area 146 of the first washer 134 so that the second washer 136 matingly engages the recessed area 146 of the first washer 134. A central receptacle 148 of the second washer 136 has an open top end 150 and a closed bottom end 152 where the receptacle has a size and shape, and more specifically, a diameter that corresponds to a diameter of the through-hole 142 in the first washer 134. The through-hole 142 defined by the first washer 134 and the receptacle 148 in the second washer 136 are aligned with each other such that the male member 130 is inserted through the through-hole 142 and into the receptacle 148 when the male member is connected to the washer assembly 132. It should be appreciated that the male member 130, the first washer 134 and the second washer 136 may be made of EVA or any suitable material or combination of materials.

Referring to FIG. 11, one or more ends 102 of the upper 104 are secured to an outsole 12 of an article of footwear or shoe 10 by inserting the first washer 134 in the corresponding recessed area 154 in the outsole 12 and then inserting the second washer 136 in the recessed area 146 defined by the first washer 134. The first and second washers 134 and 136 are inserted into the outsole 12 so that the receptacle 148 in the second washer 136 and the through-hole 142 in the first washer 134 align with a through-hole 141 defined by the outsole 12. The male member 130 of the connector 100b is then inserted through the corresponding aligned through-holes 141, 142 respectively in the outsole 12 and the first washer 134 and matingly engages the receptacle 148 in the second washer 136. The male member 130 of the connector 100b is configured with a diameter that is equal to or greater than a diameter of the through-hole 142 in the first washer 134 and/or a diameter of the receptacle 148 in the second washer 136 to form a friction fit between the male member 130 and the first and second washers of the washer assembly. In the illustrated embodiment, the washer assembly 132, and more specifically, the first washer 134 defines a slot 143 that extends through the first washer to enable the diameter of the first washer to expand when the male member 130 is inserted through the first washer. It should be appreciated that at least one of the first washer 134 and the second washer 136 may include one or more slots 143 as described above for allowing expansion of the diameters of the first and/or second washers when the male member 130 is inserted into the first and/or second washers 134, 136.

Additionally in an embodiment, the male member 130 and/or the first and second washers 134, 136 are heated such that the materials of the male member and the first and second washers at least partially melt and bond together to secure the male member to the washer assembly 132. Alternatively, an adhesive or glue may be applied in the receptacle 148 of the second washer 136 and/or the through-holes of the first washer 134 and the outsole 12 to adhere or bond the male member 130 of the connector 100b to the washer assembly 132. It is contemplated that the first and second washers 134 and 136 and the male member 130 of the connector 100b may be any suitable size or shape that allows the male member to connect to and be secured to the washer assembly. As shown in FIG. 11, the washer assembly 132 has a width or diameter that is greater than the width or diameter of the through-hole 141 in the outsole 12 such that the washer assembly 132 prevents upward movement of the end 102 of the upper 104 and thereby the release of the end from the outsole 12 after the end of the upper is secured to the washer assembly 132 as described above.

While a particular embodiment of the present article of footwear 10 has been described herein, it will be appreciated by those skilled in the art that changes and modifications may be made thereto without departing from the invention in its broader aspects.

What is claimed is:

1. An article of footwear comprising:
   an outsole defining at least one through-hole;
   a fabric upper having a plurality of ends; and
   at least one connector including a male member co-molded with at least one of said ends of said fabric upper, and a female member, said male member having a length and a uniform diameter extending along the entire length of said male member, and said female member being configured to be inserted into said at least one through-hole, wherein said upper is secured to said outsole by matingly engaging said male member with said female member in said at least one through-hole.

2. The article of footwear of claim 1, wherein said female member includes a flange having a diameter that is greater than a diameter of said through-hole.

3. An article of footwear comprising:
   an outsole defining at least one through-hole and a recessed area in communication with said at least one through-hole;
   a fabric upper; and
   at least one connector including a male member and a washer assembly, said male member having a length and a uniform diameter extending along the entire length of said male member, and being co-molded with said fabric upper, and said washer assembly defining a receptacle, wherein said upper is secured to said outsole by inserting said washer assembly into said recessed area and inserting said male member through said through-hole into mating engagement with said receptacle of said washer assembly.

4. The article of footwear of claim 3, wherein said washer assembly includes a first washer and a second washer, said first washer defining a through-hole and said second washer including said receptacle.

5. The article of footwear of claim 4, wherein said diameter of said male member is greater than a diameter of said receptacle for forming a friction fit between said male member and said second washer.

6. The article of footwear of claim 4, wherein said first washer has an upper tapered body and a lower flange radially extending from said body, said flange having a diameter that is greater than a diameter of said at least one through-hole.

7. The article of footwear of claim 4, said first washer defining a recessed area configured to receive said second washer.

8. The article of footwear of claim 4, wherein said first washer defines a slot extending through said first washer for enabling a diameter of said through-hole of said first washer to expand to receive said male member.

9. The article of footwear of claim 3, wherein said diameter of said male member is greater than a diameter of said receptacle for forming a friction fit between said male member and said washer assembly.

* * * * *